Feb. 10, 1931.     P. A. McABEE     1,791,734
SEWING MACHINE GOVERNOR
Filed Jan. 22, 1927
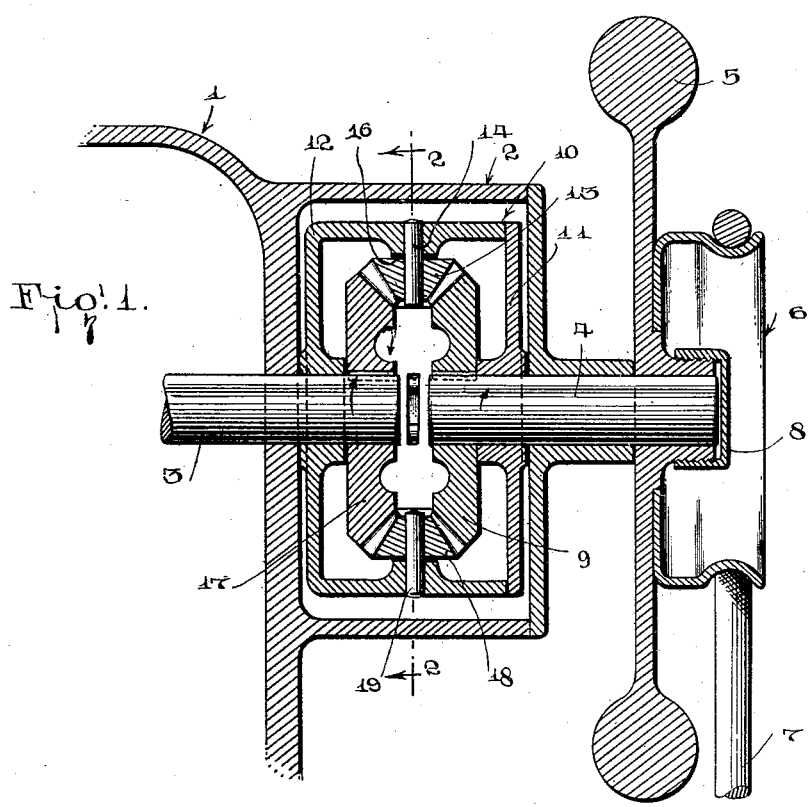
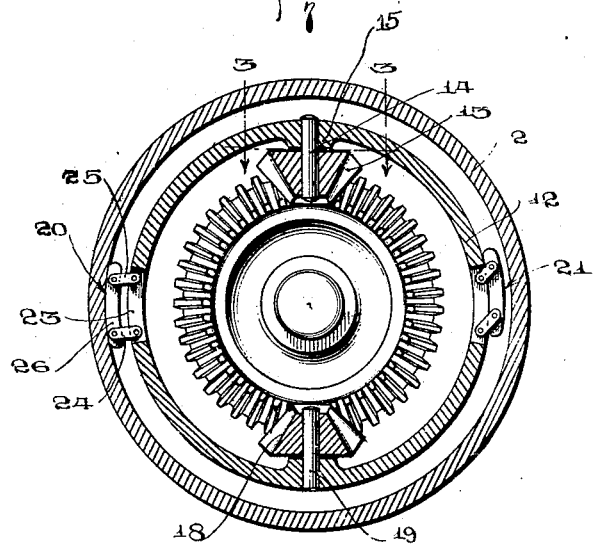
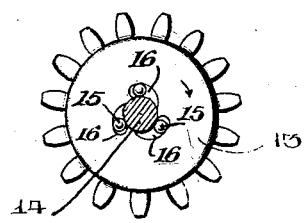
INVENTOR
Paul A. McAbee
BY
Munn & Co.
ATTORNEY Patented Feb. 10, 1931

1,791,734

UNITED STATES PATENT OFFICE

PAUL A. McABEE, OF FORT PIERCE, FLORIDA

SEWING-MACHINE GOVERNOR

Application filed January 22, 1927. Serial No. 162,879.

This invention relates to governors for controlling the direction of movement of the drive or operating shaft, and more particularly to sewing machine governors.

A primary object of the invention is to provide a simple and efficient device of this character constructed so that power will be transmitted to the driven, or needle operating shaft, in one direction, (clock-wise for illustration), regardless of the direction in which the driving shaft is rotated.

Another object is to provide an improved clutch mechanism automatically engageable and releasable according to the direction in which the driving shaft is rotated.

In carrying out these objects, the invention is susceptible of a wide range of modification without departing from the spirit or sacrificing any of the advantages of the claimed invention; there being shown in the drawings for illustrative purposes a preferred and practical form, in which;

Figure 1 represents a longitudinal section of the device constituting this invention, Figure 2 is a transverse section taken on the line 2—2 of Figure 1, and Figure 3 is a detail horizontal section taken on the line 3—3 of Figure 2.

In the embodiment illustrated a goose neck housing 1 of ordinary construction is shown having a stationary extension 2 in which is journalled the driven or needle operating shaft 3 and the driving shaft 4, said shafts being arranged in longitudinal alignment, shaft 3 extending into the housing 1 and having fixed to its inner end a bevelled gear 17 and shaft 4 extending out through the extension 2 and having fixed to its outer end a balance wheel 5 which carries a driving pulley 6 here shown equipped with a pulley belt 7. A cap 8 is threaded on the hub of wheel 5 to protect the outer end of shaft 4. A bevel gear 9 similar to gear 17 is fixed to the inner end of shaft 4 within a movable gear housing 10, one end wall or section 11 of which is loose on shaft 4, and the other section or end 12 is loose on shaft 3. Two secondary bevelled gears 13 and 18 are rotatable on stub shafts 14 and 19, respectively, which are shrunken into housing section 12 at diametrically opposite points and mesh with gears 9 and 17. A series of balls 15 are carried by gear 13 and housed in cam recesses 16 formed in the wall of the gear opening which provide a ratchet clutch and permits the gear 13 to be locked to and turned with the shaft 14 when gear 9 turns in a clockwise direction and to release and turn on the shaft 14 when gear 9 turns in an anticlockwise direction.

Clutch or one-way brake members 20 and 21 are mounted at diametrically opposite points on the movable gear housing 10 in slots 23 formed in said housing and each member comprises a toggle like structure composed of two links 24 and 25 pivoted at one end in the housing slot 23 at points spaced from the end walls of said slot. The other ends of said links project beyond the housing section 12 and are pivotally connected with a cross bar or shoe 26 which unites the links and is curved slightly to conform to the curvature of the inner face of the stationary housing 2 with which it is designed to have braking engagement when housing 12 moves counter clockwise, which occurs on the counter clockwise movement of gear 9.

*Operations—in case of a clock wise movement*

Belt 7 imparts rotary power to the balance wheel 5 through the pulley 6 and said wheel being fixed to shaft 4, said shaft is rotated carrying with it gear 9. It is obvious from the above description that gear 9 by imparting a clock wise motion to housing 10 would cause clutch members 20 and 21 to be released and clutch member 15 to be engaged with shaft 14 which would lock together the entire unit, which consists of bevel gears 9 and 17, secondary gears 13 and 18, sections 11 and 12 of housing 10 and clutch members, revolving it in a one to one ratio. Thus rotating shaft 3 in a clock wise direction.

*Operations—in case of an anti-clock wise movement*

If however, belt 7 should impart power to balance wheel 5 through pulley 6 and said wheel being fixed to shaft 4, which rotates carrying with it bevel gear 9, in a counter clockwise motion, it is obvious from the above description, that gear 9 rotating in a counter clockwise motion would cause clutch members 20 and 21 to engage housing 2 thereby holding housing 10 stationary and releasing said member 15 within the gear 13, allowing gears 13 and 18 to rotate on their spindles. Thus gear 9 imparting power to gears 13 and 18 would cause said gears (stub shafts 14 and 19 being stationary as housing 10 is stationary), to transmit power to gear 17 in a clock wise direction. Gear 17 is fixed to and rotates with shaft 3, or needle operating shaft, rotates it in a clock wise direction, being the same direction as when shaft 4 and gear 9 rotate in a clock wise direction, thereby ensuring the turning of shaft 3 in the same direction, no matter in what direction shaft 4 be turned.

While this device is shown embodied in a sewing machine governor, obviously it may be used in connection with any other mechanical apparatus to which it is adapted.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. In a machine governor, the combination with longitudinally alined driving and driven shafts, a housing encompassing the adjacent ends of said shafts, intermeshing gears carried by said shafts and said housing for transmitting motion from the driving to the driven shaft, the housing carried gears being secondary gears, a ratchet clutch carried by one of said secondary gears and said housing and automatically operable on the turning of the driving shaft in one direction to lock said secondary gear to the housing to cause said gears, shafts, and housings to turn as a single unit, a fixed member located adjacent said housing, brake shoes carried by the housing to engage said member and lock the housing against turning when the driving shaft is rotated in another direction, said brake member being releasable when said shaft turns to permit the secondary gear which carries one of the clutch members to rotate independently of the housing and through the gear carried by the driven shaft operates the latter to turn it in a direction opposite to that in which the driving shaft is turned, thus insuring the turning of the driven shaft in one direction only regardless of the direction in which the driving shaft is turned.

2. In a machine governor, the combination with longitudinally alined driving and driven shafts, an outer stationary housing encompassing the meeting or opposed ends of said shafts, a movable housing supported in said stationary housing, said shafts extending one through one wall of said housings and another through the opposed wall thereof, bevelled gears fixed one to each of said adjacent shaft ends, a secondary gear carried by said movable housing and meshing with said bevelled gears, a one-way ratchet clutch mechanism between said movable housing and said secondary gear whereby said gear is locked to the housing when the driving shaft is rotated in one direction and the shafts, gears and housing thereby adapted to rotate in the same direction as a single unit, and means for holding said movable housing stationary when the driving shaft is rotated in the opposite direction, said clutch carried secondary gear being released from the housing on such turning of the driving shaft so that said secondary gear will through the driven shaft-carried gear operate to transmit motion to the driven shaft and rotate it in a direction opposite to that in which the driving shaft is rotated so that the direction in which the driven shaft is rotated will be the same regardless of the direction in which the driving shaft is rotated.

3. In a machine governor an outer stationary housing, a movable housing mounted in said stationary housing, longitudinally alined driving and driven shafts extending through said housings with their ends located in the movable housing, intermeshing gears carried by said shafts and said movable housing for transmitting motion from the driving to the driven shaft, the housing carried gears being secondary gears and one of them provided with means for releasably locking it to the movable housing when the driving shaft is turned in one direction whereby the housing and gear turn in unison, a brake member carried by the movable housing and operable on the movement of the driving shaft in the direction opposite to the above mentioned direction to engage the stationary housing with the movable housing, said turning of the driving shaft also operating to release the clutch carried secondary gear permitting said secondary gear to actuate the driven shaft-carried gear and rotate said shaft in a direction opposite to that in which the driving shaft is rotated.

PAUL A. McABEE.